United States Patent
Simonini et al.

(10) Patent No.: US 10,933,879 B2
(45) Date of Patent: Mar. 2, 2021

(54) CONTROLLING THE POWERTRAIN OF A VEHICLE

(71) Applicant: Proterra, Inc., Burlingame, CA (US)

(72) Inventors: Matthew Simonini, Greenville, SC (US); Jarred Vallbracht, Greenville, SC (US)

(73) Assignee: Proterra Inc., Burlingame, CA (US)

( * ) Notice: Subject to any disclaimer, the term of this patent is extended or adjusted under 35 U.S.C. 154(b) by 115 days.

(21) Appl. No.: 16/153,329

(22) Filed: Oct. 5, 2018

(65) Prior Publication Data

US 2019/0106112 A1 Apr. 11, 2019

Related U.S. Application Data

(60) Provisional application No. 62/569,316, filed on Oct. 6, 2017.

(51) Int. Cl.
*B60W 10/08* (2006.01)
*B60W 30/19* (2012.01)
(Continued)

(52) U.S. Cl.
CPC .......... *B60W 30/19* (2013.01); *B60W 10/08* (2013.01); *B60W 10/11* (2013.01); *F16H 61/0437* (2013.01); *F16H 63/502* (2013.01); *B60W 2300/10* (2013.01); *B60W 2510/101* (2013.01); *B60W 2510/1005* (2013.01); *B60W 2710/0666* (2013.01); *B60W 2710/08* (2013.01); *B60W 2710/1005* (2013.01); (Continued)

(58) Field of Classification Search
CPC ............... Y10T 477/33; Y10T 477/347; F16H 2061/0422; F16H 2061/0425; F16H 63/502; F16H 2061/047; B60W 30/19; B60W 10/11; B60W 10/08; B60W 2710/1005; B60W 2510/1005; B60W 2510/101; B60W 2710/08; B60W 2710/083

See application file for complete search history.

(56) References Cited

U.S. PATENT DOCUMENTS 5,807,205 A * 9/1998 Odaka ................. B60L 7/00 477/20
5,980,424 A 11/1999 Huber et al.
(Continued)

FOREIGN PATENT DOCUMENTS

DE 102015222339 5/2017
EP 1370438 5/2005
(Continued)

OTHER PUBLICATIONS

European Search Report issued in corresponding European Application No. 18199052.4 dated Mar. 8, 2019 (6 pages).
(Continued)

*Primary Examiner* — Roger L Pang
(74) *Attorney, Agent, or Firm* — Bookoff McAndrews, PLLC

(57) ABSTRACT

The power train of an electric vehicle includes an electric motor and a gearbox coupling the electric motor to a drive wheel. A controller may be configured to initiate a gear shift in the gearbox, and activate one or both of (a) a torque jog in electric motor, or (b) a burst of a pressurized fluid in an actuator to assist with the gear shift.

20 Claims, 6 Drawing Sheets

(51) Int. Cl.
*F16H 61/04* (2006.01)
*F16H 63/50* (2006.01)
*B60W 10/11* (2012.01)

(52) U.S. Cl.
CPC .......................... *B60W 2710/1083* (2013.01); *B60Y 2200/143* (2013.01); *B60Y 2200/91* (2013.01); *F16H 2061/047* (2013.01); *F16H 2061/0422* (2013.01); *F16H 2061/0425* (2013.01); *F16H 2200/0021* (2013.01); *F16H 2200/0034* (2013.01)

(56) References Cited

U.S. PATENT DOCUMENTS

| | | | | |
|---|---|---|---|---|
| 7,617,896 | B2* | 11/2009 | Ogata | B60K 6/48 180/65.7 |
| 8,453,773 | B2 | 6/2013 | Hill et al. | |
| 8,827,867 | B1 | 9/2014 | Simonini | |
| 2004/0200648 | A1* | 10/2004 | Tarasinski | B60K 7/0007 180/65.7 |
| 2012/0010043 | A1* | 1/2012 | Inagaki | B25F 5/001 477/20 |
| 2014/0070767 | A1 | 3/2014 | Morris et al. | |
| 2017/0305430 | A1* | 10/2017 | Kuzuhara | B60W 20/00 |
| 2018/0037128 | A1 | 2/2018 | Gerber et al. | |
| 2019/0219159 | A1* | 7/2019 | Rinderknecht | F16H 61/688 |

FOREIGN PATENT DOCUMENTS

| | | |
|---|---|---|
| EP | 2655111 | 5/2016 |
| FR | 2 982 823 | 5/2013 |

OTHER PUBLICATIONS

Notice of Opposition issued in corresponding European Application No. 18199052.4 dated Dec. 9, 2020 (66 pages).

\* cited by examiner

CONTROLLING THE POWERTRAIN OF A VEHICLE

CROSS-REFERENCE TO RELATED APPLICATIONS

This application claims the benefit of U.S. Provisional Application No. 62/569,316, filed Oct. 6, 2017, the disclosure of which is incorporated herein by reference in its entirety.

TECHNICAL FIELD

Embodiments of this disclosure relate to systems for controlling the powertrain of a vehicle.

BACKGROUND

The powertrain of a vehicle refers to a group of components that generate and deliver power to the road surface to propel the vehicle along the road. In general, the powertrain includes a power source that generates or provides power, and a transmission that transmits the power to the drive wheels of the vehicle. In an electric vehicle, or a hybrid vehicle operating in the electric mode, one or more electric motors serve as the power source. In such vehicles, a battery provides power to drive the motors direct to produce torque. An inverter coupled to the motors direct current to the motors to produce torque in response to a torque request by a driver of the vehicle. The driver controls the position of the accelerator and brake pedals to request different amounts of torque from the motors. In response to the torque request from the driver, a controller controls the motor to produce the requested torque. The transmission transmits the rotational power produced by the motors to the drive wheels of the vehicle. The transmission includes one or more gearboxes that convert the speed and torque produced by the motor to that desired by the vehicle. The gearboxes include gears that selectively engage or disengage to increase or decrease the speed/torque between the input and output shafts. Typically, a control unit of the powertrain initiates a gear shift in the transmission in response to driving conditions.

Embodiments of the current disclosure address controlling gear shifting in the gearboxes.

SUMMARY

Embodiments of the present disclosure relate to, among other things, devices and methods for controlling the powertrain of a vehicle. Each of the embodiments disclosed herein may include one or more of the features described in connection with any of the other disclosed embodiments.

In one aspect, a method of operating an electric vehicle that includes a gearbox that couples an electric motor to a drive wheel is disclosed. The method includes initiating a gear shift of the gearbox. The method may also include selectively activating a torque jog in the electric motor to assist with the gear shift, wherein the torque jog results in a fluctuation in torque output by the electric motor.

In another aspect, a method of operating an electric vehicle that includes a gearbox that couples an electric motor to a drive wheel and a fluid-activated actuator configured to perform a gear shift in the gearbox is disclosed. The method includes initiating a gear shift of the gearbox. The method may also include selectively activating one or both of (a) a torque jog in the electric motor to assist with the gear shift, and (b) a pressurized fluid into the actuator to assist with the gear shift. Wherein the torque jog may result in a fluctuation in torque output by the electric motor.

In another aspect, an electric vehicle is disclosed. The electric vehicles includes an electric motor, a drive wheel, a gearbox, a fluid activated actuator, and a controller. The gearbox may be configured to shift from a first configuration of gears to a second configuration of gears through a neutral configuration. Wherein, (a) in the first and second configurations, the electric motor is operatively coupled to the drive wheel with different gear ratios, and (b) in the neutral configuration, the electric motor is operatively decoupled from the drive wheel. The fluid activated actuator may be configured to shift the gearbox from the first configuration to the second configuration. And, the controller may be configured to initiate a gear shift of the gearbox from the first configuration to the second configuration, and activate a torque jog in the electric motor. The torque jog may results in a fluctuation in torque output by the electric motor.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes a system and method for controlling the powertrain of an electric vehicle. While principles of the current disclosure are described with reference to an electric bus, it should be understood that the disclosure is not limited thereto. Rather, the systems and methods of the present disclosure may be used in any vehicle having a transmission with one or more gearboxes. As used herein, the term "electric vehicle" includes any vehicle or transport machine that is driven at least in part by electricity (e.g., all-electric vehicles, hybrid vehicles, etc.).

Figure 1:
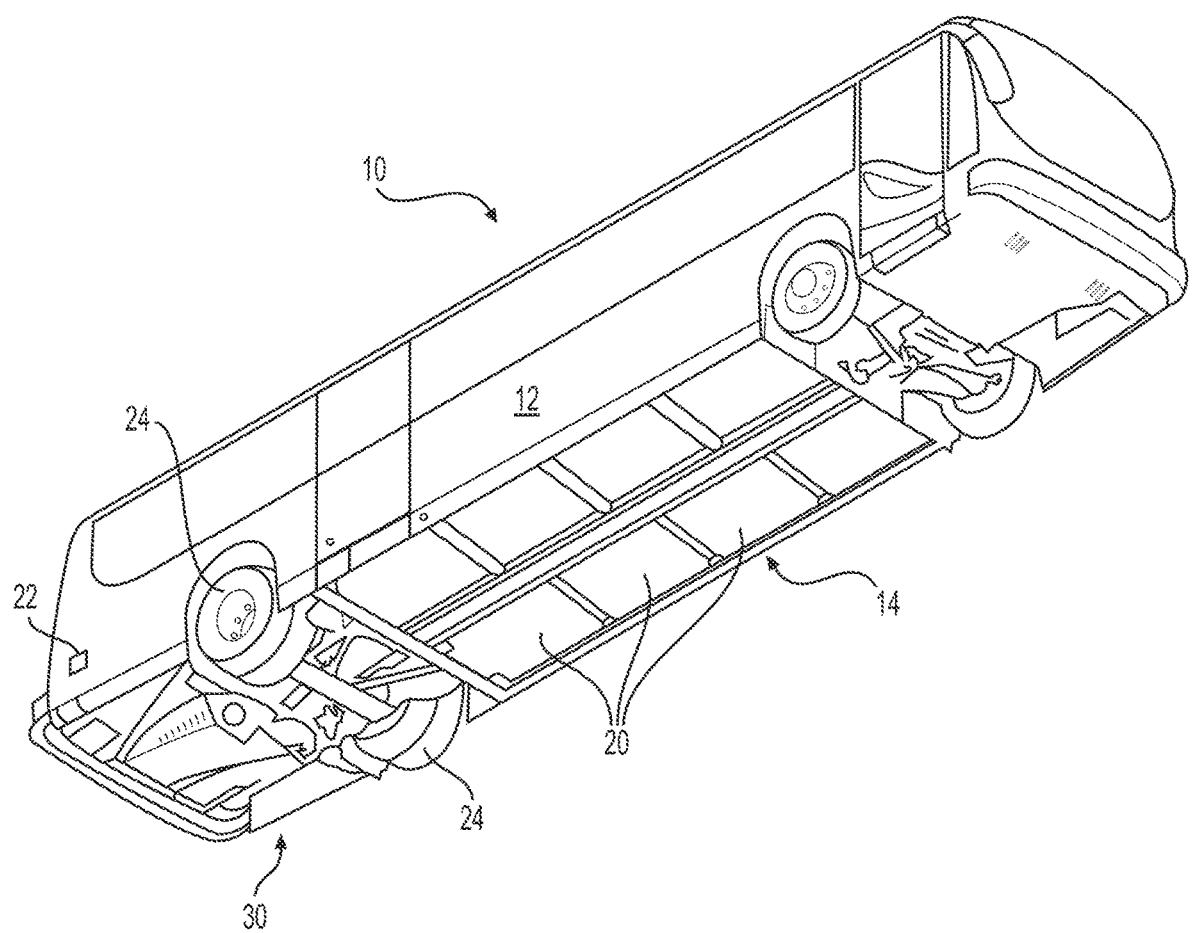
FIG. 1 illustrates an exemplary electric bus according to the present disclosure.

FIG. 1 illustrates an electric vehicle in the form of a bus 10. Electric bus 10 may include a body 12 enclosing a space for passengers. In some embodiments, some (or substantially all) parts of body 12 may be fabricated using one or more composite materials to reduce the weight of bus 10. Without limitation, body 12 of bus 10 may have any size, shape, and configuration. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches from the road surface. In this disclosure, the term "about" is used to indicate a possible variation of ±10% in a stated numeric value.

Bus 10 may include a powertrain 30 that propels the bus 10 along a road surface. Powertrain 30 may include one or more electric motors that generate power, and a transmission that transmits the power to a pair of drive wheels (e.g., wheels 24) of the bus 10. Batteries 14 may store electrical energy to power the electric motors of the powertrain 30. In some embodiments, these batteries 14 may be configured as a plurality of battery packs 20 positioned in cavities located under the floor of the bus 10. In some embodiments, some or all of the battery packs 20 may be positioned elsewhere (e.g., roof) on the bus 10. The batteries 14 may have any chemistry and construction. The battery chemistry and construction may enable fast charging of the batteries 14. In some embodiments, the battery chemistry may enable standard charging (i.e., bus 10 may be a non fast charge bus). In some embodiments, the batteries 14 may be lithium titanate oxide (LTO) batteries. In some embodiments, the batteries 14 may be nickel metal cobalt oxide (NMC) batteries. It is also contemplated that, in some embodiments, the batteries 14 may include multiple different chemistries. Some of the possible battery chemistries and arrangements in bus 10 are described in commonly assigned U.S. Pat. No. 8,453,773, which is incorporated herein by reference in its entirety.

Bus 10 may include one or more electrical interfaces to charge the batteries 14. Any type of charging interfaces may be provided on the bus 10. In some embodiments, these charging interfaces may include charge-receiving electrodes provided on the roof (or another surface) of the bus 10 to charge the batteries 14. The roof-mounted charging interface may include components (e.g., inverted pantograph, etc.) that raise from the roof to interface with the charging electrodes of an external charging station to charge the batteries 14. In some embodiments, a charging head of the charging station may descend and interface with charge-receiving electrodes on the roof of the bus 10. Some possible embodiments of such charging interfaces are described in commonly-assigned U.S. Patent Application Publication No. 2014/0070767, which is incorporated by reference in its entirety herein. Alternatively or additionally, bus 10 may include other charging interfaces, such as, for example, a charge port 22 (e.g., an electric socket) that is configured to receive a charging plug and charge the bus 10 using power from a utility grid. In such embodiments, the bus 10 may additionally or alternatively be charged by connecting the plug to the socket. Some possible embodiments of charge port 22 that may be used for bus 10 are described in commonly-assigned U.S. patent application Ser. No. 15/589,281, filed May 8, 2017, which is incorporated by reference in its entirety herein.

Figure 2:
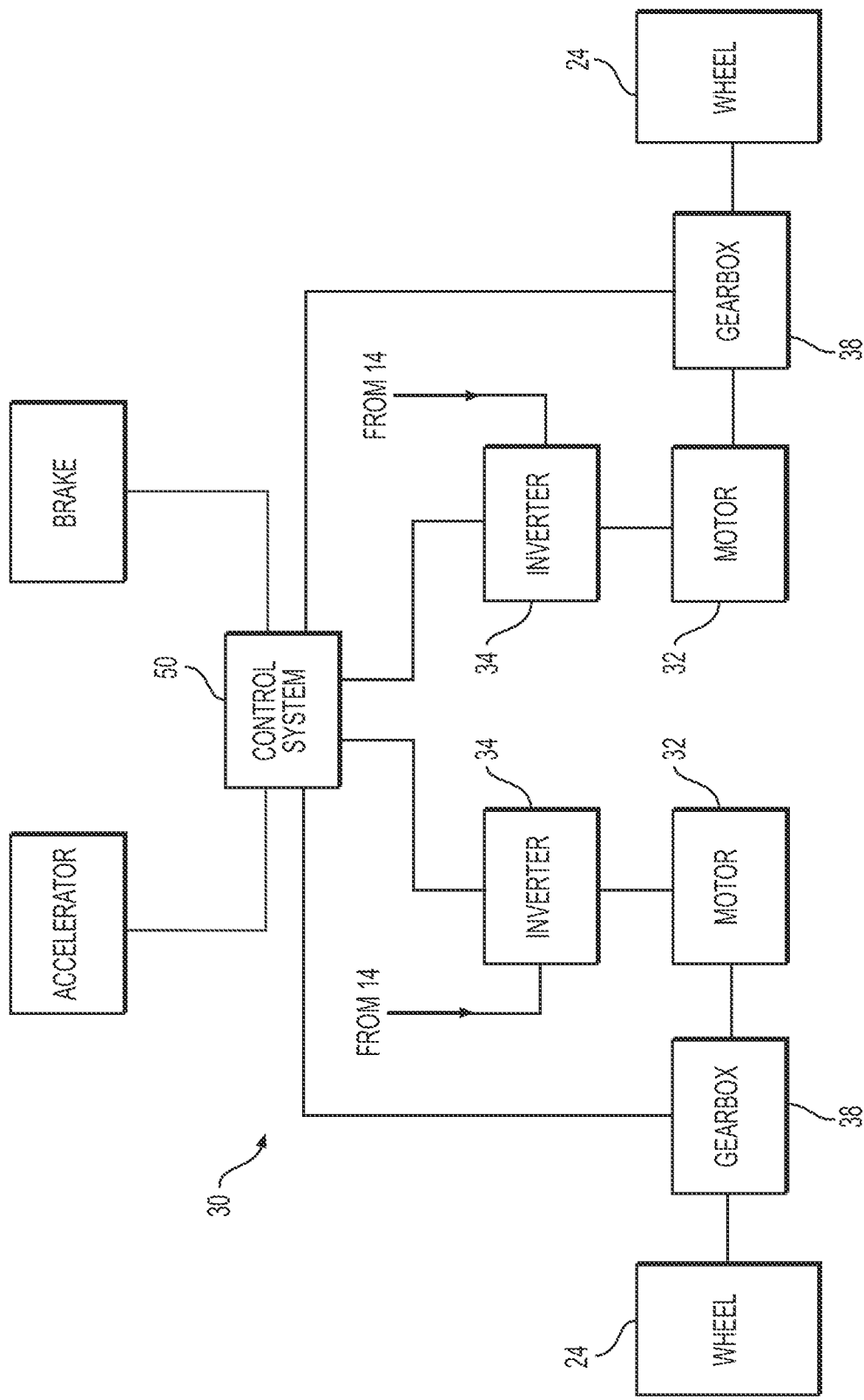
FIG. 2 is a schematic illustration of an exemplary powertrain of the bus of FIG. 1.

FIG. 2 is a schematic illustration of an exemplary powertrain 30 of bus 10. As illustrated in FIG. 2, powertrain 30 includes two electric motors 32, each coupled to a drive wheel 24 of the bus 10 through a gearbox 38. It should be noted that the arrangement of the powertrain 30 illustrated in FIG. 2 is only exemplary, and other arrangements are possible. In the illustrated embodiment, the components of the power train 30 are packaged such that these components extend linearly between two drive wheels 24 of the bus 20. These drive wheels may be pair of rear wheels in a rear-wheel drive bus, the pair of front wheels in a front-wheel drive bus, or a pair of wheels between the front and rear wheels, for example, in a three-axle articulated bus. However, a linear arrangement between the wheels is not a requirement, and the components of the powertrain 30 may be arranged in any manner (such as, for example, extending longitudinally along the length of the bus).

Although powertrain 30 is illustrated as having two electric motors 32, this is only exemplary. In general, the powertrain 30 may include any number of electric motors 32. For example, in some embodiments, a single electric motor 32 may provide power to all the drive wheels of the bus 10 through a single gearbox or multiple gearboxes, and in some embodiments, multiple electric motors may provide power to each drive wheel through a single gearbox or multiple gearboxes. The electric motors 32 may be permanent magnet synchronous motors (AC motors) that operate using power from the batteries 14. In some embodiments, high voltage DC power from the batteries 14 may be converted into 3-phase AC power using an inverter 34 (a single inverter or, as illustrated in FIG. 2, using two inverters 34) and directed to the motors 32. In some embodiments, a dual channel inverter (e.g., a single inverter having different channels that provide power to, and control, motor independently) may be used in place of the two inverters.

A control system 50 may control the operations of the powertrain 30. The control system 50 may be an integrated master control system that controls several operations of the bus 10. In some embodiments, control system 50 may be a distributed control system as known to people of ordinary skill in the art. That is, the functions of control system 50 may be divided between several different control systems (e.g., powertrain controller, inverter/battery controller, vehicle controller, etc.) of the bus 10. As is known in the art, control system 50 may include a collection of several mechanical, electrical, and integrated circuit devices (for example, computational units, A/D converters, memory, switch, valves, actuators, fuses, etc.) that function collectively to control the operation of the bus 10. Among other functions, the control system 50 may control the operation of the powertrain 30 based on several inputs from the bus 10. These inputs may include signals indicative of the position of the accelerator pedal and the brake pedal (i.e., driver input) of the bus 10. Based on these (and other) signals, the control system 50 may send a torque request signal to the inverters 34 to produce the requested torque from the motors 32.

Each electric motor 32 rotates an input shaft that connects the motor 32 to the gearbox 38. An output shaft from the gearbox 38 rotates the drive wheel 24 directly (as illustrated in FIG. 2) or via a speed reduction unit (e.g., connected between the gearbox 38 and the wheel 24) (not shown). In general, the torque output of each motor 32 is proportional to the magnitude of the current directed into that motor 32 from the inverter 34. Although each motor 32 is described as a permanent magnet synchronous motor, one or more other types of motors may be used in powertrain 30. In some embodiments, the two electric motors 32 may be the same or substantially similar to each other, the two gearboxes 38 may be the same or substantially similar to each other, and the two inverters 34 may be the same or substantially similar to each other. Therefore, in the discussion below, all references to electric motor 32 apply to both the electric motors, all references to the inverter 34 apply to both the inverters, and all references to the gearbox 38 apply to both the gearboxes 38. However, it should be noted that this is not a requirement. That is, in some embodiments, the two motors 32 may be different, the two gearboxes may be different, and the two inverters may be different from each other. Typically, the gearbox 38 on the left side of FIG. 2 is referred to as the street-side gearbox, and the gearbox 38 on the right side of FIG. 2 is referred to as the curb-side gearbox.

Figure 3:
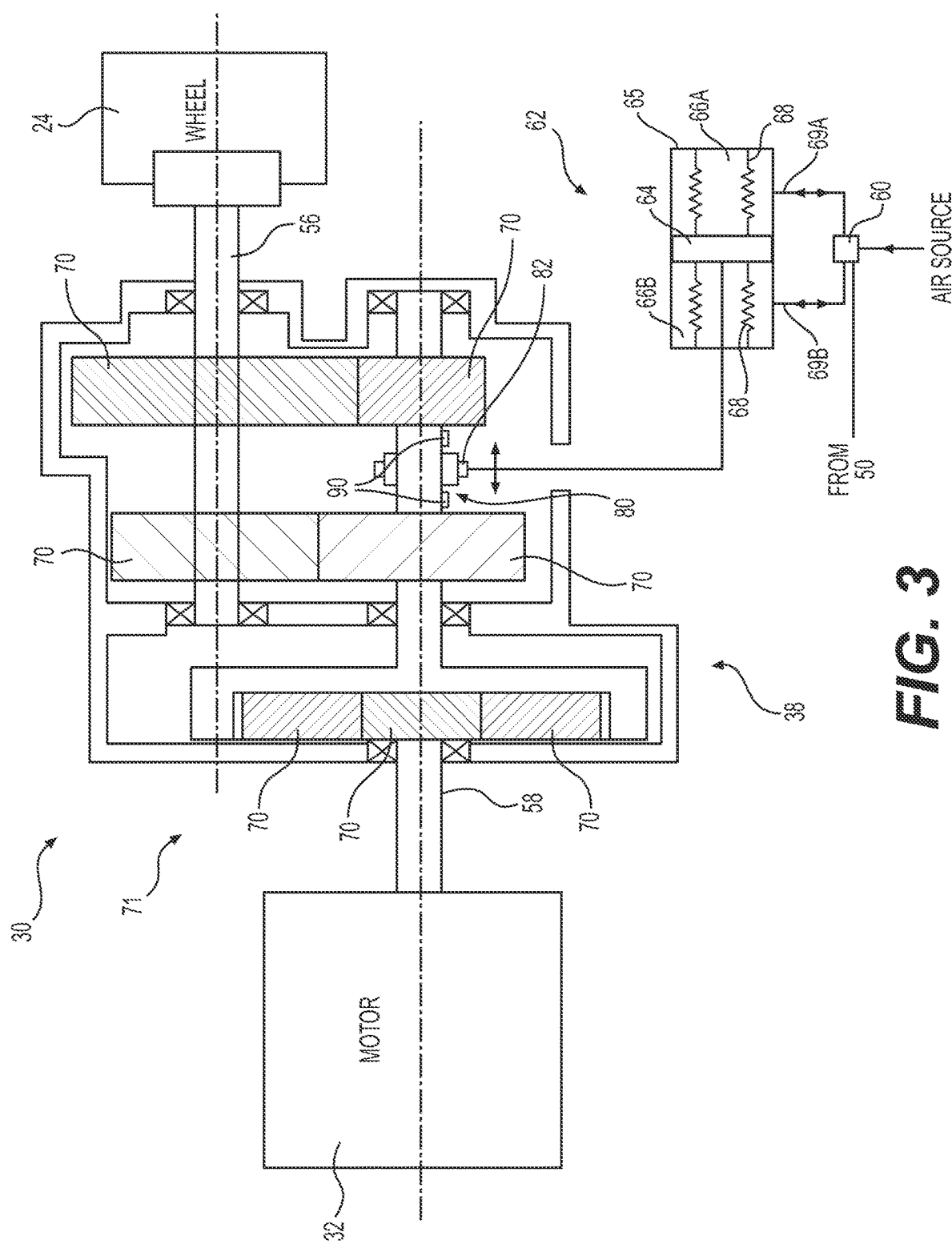
FIG. 3 is a schematic illustration of an exemplary gearbox of the powertrain of FIG. 2.

The gearbox 38 may be a multispeed gearbox which includes a plurality of gears configured to switch between different gear ratios to convert the rotation speed (and torque) of the gearbox input shaft to several different speeds (and torques) of the gearbox output shaft. FIG. 3 shows an exemplary embodiment of a multispeed gearbox 38 of powertrain 30. As illustrated in FIG. 3, in some embodiments, gearbox 38 may be directly coupled to the output shaft of the electric motor 32. In particular, a motor output shaft 58 from electric motor 32 is connected directly (i.e. without a clutch assembly) to a planetary gear assembly 71 contained within the gearbox 38. Two different gear ratios may connect the motor output shaft 58 with the output shaft 56 of the gearbox 38. Although not a requirement, in some embodiments, as shown in FIG. 3, the motor output shaft 58 and the gearbox output shaft 56 may be parallel to one another, with the gearbox output shaft 56 located above the motor output shaft 58, and thus closer to the bus body 12.

Gearbox 38 may include a plurality of gears 70 with the ability to switch between different gear ratios to convert the rotation speed (and torque) of the motor output shaft 58 to different speeds (and torques) of the gearbox output shaft 56. In the illustrated embodiment, gearbox 38 is a two-speed gearbox with three distinct states: neutral, low gear, and high gear. The low and high gears may be activated by engaging (and/or disengaging) selected gears 70 and a synchronizer of the gearbox 38 to obtain two different gear ratios between the input and output shafts. The two gear ratios convert the speed/torque of the motor output shaft 58 to two different speeds/torques of the gearbox output shaft 56. The gear ratios for high gear and low gear may be optimized to increase fuel economy for an electric bus application. The gearbox 38 may be shifted between the low gear and the high gear automatically or manually, through the control system 50 to suit different operating states of the bus 10. For example, during acceleration of the bus 10, the control system 50 may switch the gearbox 38 from the low gear to the high gear, and during deceleration, the control system 50 may switch the gearbox 38 from a high gear to a low gear. The gearbox 38 passes through its neutral position when transitioning from the high gear to the low gear, or when transitioning from the low gear to the high gear. When the gearbox 38 is in its neutral position, the motor output shaft 58 and the gearbox output shaft 56 are operatively decoupled, thus inhibiting power transfer to the drive wheel 24 through the gearbox 38.

As shown in FIG. 3, gearbox 38 includes a solenoid 60 that receives signals from the control system 50 and shifts the gears 70 between high gear, neutral, and low gear. In general, the solenoid 60 may be an electrically actuated, pneumatically actuated, or hydraulically actuated mechanism. In some embodiments, as illustrated in FIG. 3, the solenoid 60 activates an actuator 62 (e.g., actuated by air or another fluid) to shift between the different gears of the gearbox 38. The actuator 62 includes a piston 64 operatively coupled to a shift fork 80 that operates to selectively engage and/or disengage different gears 70 of the gearbox 38 to shift between high gear, neutral, and low gear. The piston 64 may be positioned in a cylinder 65 to form a right-side chamber 66A and a left-side chamber 66B. In some embodiments, movement of the piston 64 to the left (i.e., into the left-side chamber 66B) moves the shift fork 80 to the left and shifts the gearbox 38 into high gear. And, movement of the piston to the right (i.e., into the right-side chamber 66A) moves the shift fork 80 to the right and shifts the gearbox 38 into low gear. In some embodiments, movement of the piston 64 to the left shifts the gearbox 38 into low gear and vice versa.

Cylinder 65 may include air inlet ports 69A and 69B to direct pressurized air into the right-side chamber 66A and the left-side chamber 66B, respectively, and move the piston 64 to the left or the right. Springs 68 positioned in the right-side chamber 66A and the left-side chamber 66B may resist the movement of the piston 64 as it moves to the left or the right. The movement of the piston 64 due to the pressurized air (in the right-side chamber 66A or the left-side chamber 66B) moves a shift rod element connected to the shift fork 80. In some embodiments, the shift fork 80 may move a synchronizer assembly to allow the rotating shafts to smoothly engage or disengage. When no pressurized air is directed into the cylinder 65 (i.e., the right-side chamber 66A and the left-side chamber 66B), the biasing force of the springs 68 force the piston 64 to a central location in the cylinder 65 (see FIG. 3). When the piston 64 is in this position, the shift fork 90 and the gearbox 38 are in neutral. The gearbox 38 includes one or more shift fork position feedback sensors 90 which indicate when the gearbox 38 is in either neutral, low or high gear. This feedback from sensor 90 is sent to the control system 50 which controls pressurized air flow through the air inlet ports 69A and 69B.

Control system 50 may selectively shift the gearbox 38 between low gear, high gear and neutral based on the operating conditions of the bus 10. The operating condition data may include, among others, signals indicative of desired motor speed, current motor speed, motor input current or motor torque, etc. The desired speed may be determined based on operator input (e.g., based on the position of accelerator pedal, brake pedal, etc.) or may be computed/determined based on other data (efficiency curves, etc.). Motor speed and motor input current data may be signals indicative of the existing speed of the electric motors 32 and the electric current input into the inverters 34. Based on such data, the control system 50 may transmit instructions to the gearboxes 38 to switch between low gear, neutral and high gear. These instructions may include directing electrical signals to trigger an air valve to release pressurized air into the cylinder 65 (of actuator 62) through air inlet port 69A or 69B to move the shift fork 80 and bring different gears 70 of the gearbox 38 into, and out of, engagement.

In an exemplary embodiment, the bus 10 may be travelling at, for example, 30 MPH in high gear. The speed of the motor 32 corresponding to this gear and bus speed may be, for example, 4000 RPM. The driver may now shift the gearbox 38 into low gear. The speed of the motor 32 corresponding to low gear at the current bus speed may be 7000 RPM (due to a different gear ratio). As explained previously, when the gearbox 38 shifts from high gear to low gear, it first shifts from high gear to neutral, and then from neutral to low gear. To shift the gearbox 38 from high gear (where, for example, the piston 64 is positioned in the left-side chamber 66B) to low gear (where, for example, the piston 64 is positioned in the right-side chamber 66A), the control system 50 stops pressurized air flow into the right-side chamber 66A through air inlet port 69A. When there is no pressurized air flow into the right-side chamber 66A, the biasing force of the springs 68 in cylinder 65 pushes the piston 64 to the right towards a central location in cylinder 65 (as shown in FIG. 3) and shift the gearbox 38 into neutral. When the shift fork position feedback sensors 90 indicate that the gearbox 28 is in neutral, the control system 50 changes the speed of the motor 32 to 7000 RPM (to match the speed of the wheel so that the bus 10 moves smoothly during the gear shift), and activate pressurized air flow into the left-side chamber 66B (through air inlet port 69B) to move the piston 64 to the right and shift the gearbox into low gear. The shift fork position feedback sensors 90 indicate when the gearbox 38 is in low gear.

In some embodiments, for smooth gear shifting, when executing a shift, the control system 50 may first decrease the torque produced by the motor 32 (e.g., by instructing the inverter 34) to about 0 Nm and then deactivate air flow into the cylinder 65 (to disengage the gearbox 38 and put it in neutral). As explained earlier, when air pressure is removed, the springs 68 force the shift fork 80 to the neutral gearbox position, decoupling the motor 32 from the drive wheels 24. Typically, the shift fork 90 will move the gearbox 38 to neutral in a known amount of time. For example, historical data from the shift fork position feedback sensors 90 may indicate that the gearbox 38 normally shifts into neutral (or into any other gear) about 200 milliseconds (ms) (or within any other time) after initiation of gear shifting by the control system 50. In some circumstances, component wear, part-to-part dimensional variations, etc., may cause the resistance in the shift fork mechanism to be too high for the spring force to overcome, and increase the time required (or even prevent) by the gearbox 38 to shift into neutral. Delay in the gear disengaging (or increasing the time for gear shifting) may result in inefficient or an inoperative vehicle.

The control system 50 may assist in gear disengagement (that is, shifting of the gearbox 38 from the current gear into neutral) in the gearbox 38 in multiple ways to minimize or prevent such issues related to gear shifting. In some embodiments, when the control system 50 initiates a gear shift in the gearbox 38, it may also activate a torque jog algorithm to promote gear disengagement (i.e., shifting of the gearbox 38 from the current gear into neutral). In some embodiments, the torque jog algorithm may only be activated if the gear disengagement has not successfully completed within an expected time (e.g., 200 ms, 300 ms, etc.) after sending the instructions for gear shifting (that is, after initiation of gear shifting). For example, in embodiments where the control system 50 expects the gearbox 38 to shift to neutral within about 200 ms after initiation of gear shifting (from low gear to high gear or vice versa), the control system 50 may initiate a torque jog algorithm if the gearbox 38 has not shifted from the current gear to neutral in, for example, 300 ms (or another predetermined time). In some embodiments, the control system 50 may activate the torque jog algorithm every time a gear shift is initiated. The torque jog algorithm may control the electric motor 32 to induce a momentary fluctuation (bump, jerk, twitch, etc.) in the torque output by that electric motor 32. The resulting fluctuation of torque in the motor output shaft 58 may minimize or eliminate the drag torque, or the motor inertia, and reduce the resistive forces on the shift fork assembly to assist in gear disengagement. This momentary torque fluctuation of the electric motor 32 is referred to herein as a torque jog. The torque jog may be induced by providing a varying pattern of electric current to the electric motor 32 to induce a momentary change in torque output of the motor 32.

Additionally or alternatively, in some embodiments, the control system 50 may apply a small burst of pressurized air into a chamber of the air actuator cylinder 65 to supplement the spring force that pushes the piston 64 to the right or the left to shift the gearbox from the current gear into neutral. For example, in the exemplary embodiment described previously, when the control system 50 wants to shift the gearbox 38 from high gear (where, for example, the piston 64 is positioned in the left-side chamber 66B) to low gear (where, for example, the piston 64 is positioned in the right-side chamber 66A), the control system 50 first stops pressurized air flow into the right-side chamber 66A through air inlet port 69A. When there is no pressurized air flow into the right-side chamber 66A, the biasing force of the springs 68 in left-side chamber 66B pushes the piston 64 towards the right to shift the gearbox 38 from high gear into neutral. If the spring force is not sufficient to move the piston 64 (and hence the gearbox 38) to the neutral position within an expected time, the control system 50 may direct a burst of pressurized air to the left-side chamber 66B to supplement the spring force (in the left-side chamber 66B) that pushes the piston 64 to the right. That is, to supplement the spring force, the control system 50 directs a burst of pressurized air into the cylinder chamber opposite the chamber towards which the piston 65 is attempting to move (or moving). The magnitude and duration of the air burst may depend upon the application. In some embodiments, the air burst may include a flow of pressurized air (of 1 bar, 2 bar, or any pressure) for about 100 ms (200 ms, 300 ms, etc.). In some embodiments, the control system 50 may activate the burst of pressurized air flow only if gear disengagement does not occur in an expected amount of time. For example, if the control system 50 expects the gearbox 38 to shift to neutral within about 200 ms after initiation of gear shifting, the control system 50 may initiate the burst of pressurized air if the gearbox 38 is not in neutral in, for example, 300 ms (or another predetermined time). In some embodiments, the control system 50 may activate the burst of pressurized air flow every time a gear shift is initiated.

In some embodiments, the control system 50 may apply one of either the torque jog or the burst of pressurized air to assist in gear disengagement (if gear disengagement has not occurred within an expected time, or immediately after a gear shift is initiated). In some embodiments, the control system 50 may apply both the torque jog and the burst of pressurized air to assist in gear disengagement (if gear disengagement has not occurred within an expected time, or immediately after a gear shift is initiated). In some embodiments, the control system 50 may apply one of either the torque jog or the burst of pressurized air when a gear shift is initiated, and the other if gear disengagement has not been completed within an expected time after initiation.

Figure 4A:
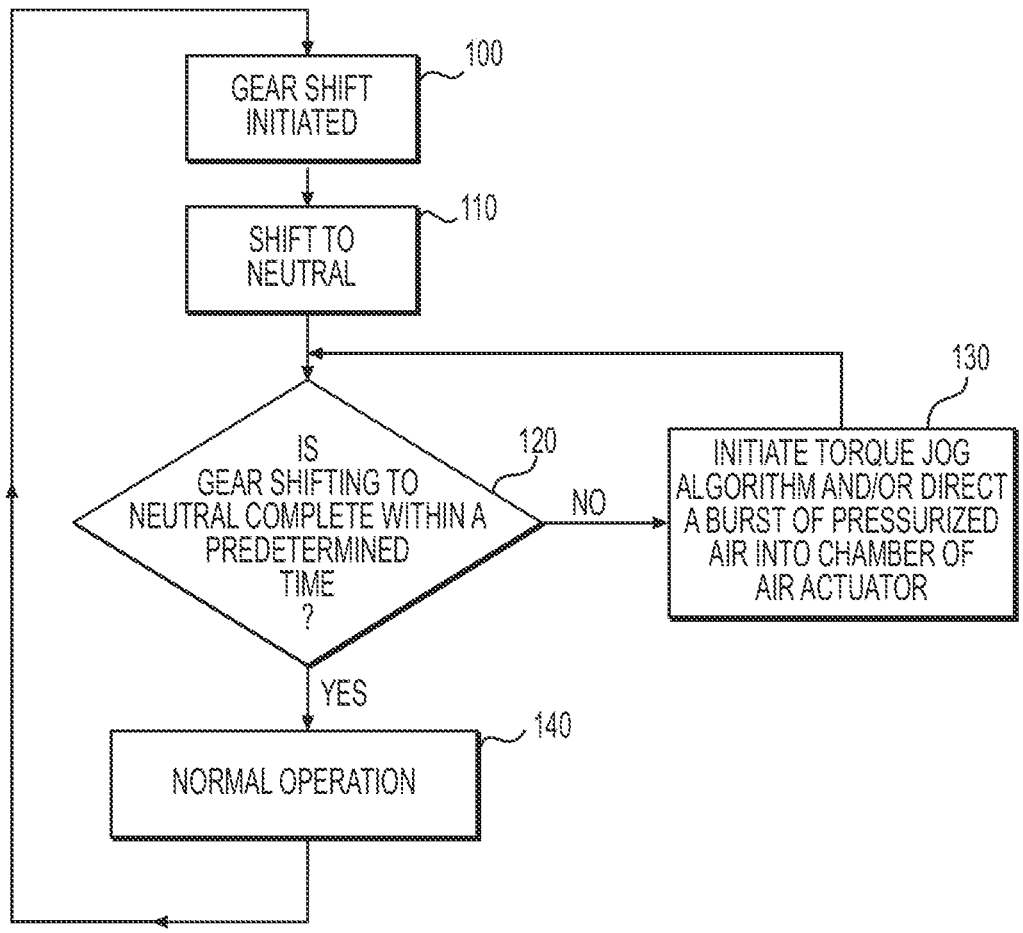
FIG. 4A illustrates an exemplary method of controlling the powertrain of FIG. 2.

FIG. 4A is a flow chart that illustrates an exemplary gear engagement method of the control system 50. Based on operator input and/or other input (bus speed and other operational parameters of bus), the control system 50 may initiate a gear shift in the gearbox 38 (step 100). For example, based on input (operator, sensor, etc.), the control system 50 may initiate a gear shift from low gear to high gear. When a gear shift is initiated (i.e., step 100), the control system 50 may first shift the gears in the gearbox 38 to neutral (step 110). As explained previously, the control system 50 may shift the gearbox 38 to neutral by stopping pressurized air flow into the cylinder 65 (of the actuator 62) to move the piston 64 to the right or the left. If gearbox is not in neutral within a predetermined amount of time (e.g., expected amount of time for gear shifting to neutral+a factor of safety) (step 120), the control system 50 may initiate the torque jog algorithm, and/or direct a burst of pressurized air into the air actuator chamber opposite the chamber towards which the piston 65 is attempting to move to assist the piston in moving (step 130). After successful gear engagement is detected, the control system 50 may continue with its normal operation (step 140). That is, shift the gearbox 38 from neutral into the requested gear to complete the gear shift. It should be noted that FIG. 5A does not show all the steps performed by control system 50 to shift gears in the gearbox 38. For example, in some embodiments, the control system 50 may decrease the motor torque to about zero prior to shifting the gearbox 38 to neutral (i.e., step 110).

Figure 4B:
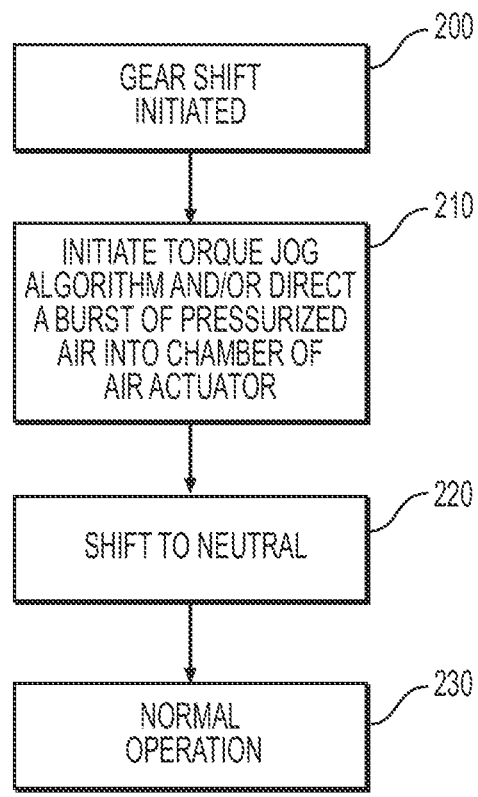
FIG. 4B illustrates an exemplary method of controlling the powertrain of FIG. 2.

FIG. 4B is a flow chart that illustrates another exemplary gear engagement method of the control system 50. In the embodiment of FIG. 4B, when a gear shift is initiated (step 200), the control system 50 may first initiate a torque jog algorithm and/or direct a burst of pressurized air into the air actuator chamber opposite the chamber towards which the piston 65 is expected to move to assist the movement of the piston (step 210). The control system 50 may then shift the gearbox 38 to neutral (step 230). As explained previously, in some embodiments, the control system 50 may decrease the motor torque to about zero prior to shifting the gearbox 38 to neutral (i.e., step 220). It should be noted that, in some embodiments, step 220 will be performed substantially simultaneously with, or before, step 210 of FIG. 4B. In some embodiments, the control system 50 may select the gear shift method (FIG. 4A or FIG. 4B) based on the gear it is shifting into. In some embodiments, the control system 50 may follow the method of FIG. 4A for shifting between gears while the bus is in motion, and the method of FIG. 4B for shifting gears while at rest (or vice versa).

As previously explained, the torque jog algorithm may control (for example, vary) the current input to the electric motor 32 to induce a variation (or torque jog) in the motor output. The torque jog may result in a torque fluctuation at the motor output shaft 58 (see FIG. 3). The resulting fluctuation in speed/torque of the shaft may assist in gear disengagement. In general, the torque jog algorithm may direct any current pattern to the electric motor 32 that provides a variation in its output. Although not a limitation, in some embodiments, a torque jog may result in a 1-20% fluctuation in the output torque of electric motor 32. In some embodiments, a torque jog may result in a 1-10% fluctuation in the motor torque. For example, if during an exemplary operation, the electric motor 32 is producing a torque of about 1000 N-m, a 5% torque jog may cause the output torque to vary from about 950 N-m to about 1050 N-m, and a 10% torque jog may cause the output torque to vary from about 900 N-m to about 1100 N-m. In some embodiments, the torque fluctuations caused by a torque jog may terminate in less than or equal to about 500 milliseconds (≤about 500 ms). That is, a torque jog may be completed in ≤about 500 ms. In some embodiments, a torque jog may be complete in ≤about 200 or ≤about 150 MS.

Figure 5A:
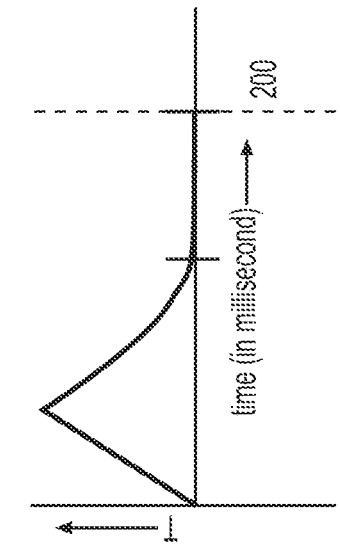
FIGS. 5A-5D are schematic illustrations of exemplary torque jog initiated by a control system in the bus of FIG. 1.

FIGS. 5A-5D illustrate a few exemplary patterns of torque jog that may be initiated by the torque jog algorithm of the control system 50. The x-axis of FIGS. 5A-5D shows the time in milliseconds, and the y-axis shows the torque output of the electric motor 32. Since motor torque is proportional to the current input into the electric motor 32, the y-axis of FIGS. 5A-5D are also indicative of the current input into the electric motor 32. In the embodiments illustrated in FIGS. 5A-5D, the torque jog algorithm induces the motor torque to fluctuate above and below its steady state torque $T_1$ (the torque output of the motor at that time). In the embodiment of FIG. 5A, the torque jog increases the motor torque to $T_1+\Delta T$ and then decreases it to $T_1-\Delta T$ within a time $t_1$ ms. As explained previously, in some embodiments, $\Delta T$ may vary between about 1-20% of $T_1$, or between about 1-10% of $T_1$, and $t_1$ may be ≤about 500 ms, ≤about 200 ms, or ≤about 150 ms.

Figure 5B:
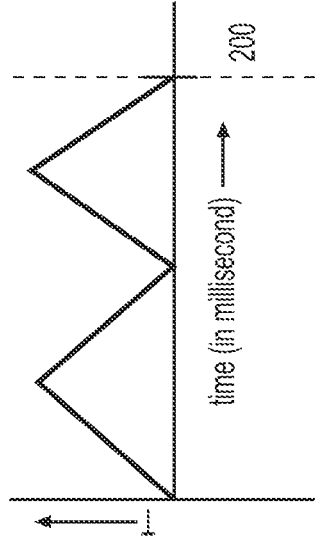

As illustrated in FIG. 5B, in some embodiments, the amount by which the torque is increased (from the steady state torque) may be different than the amount by which the torque is decreased. For example, as illustrated in FIG. 5B, the motor output torque may be increased by $\Delta T_1$ from $T_1$, and decreased by $\Delta T_2$ from $T_1$. Both $\Delta T_1$ and $\Delta T_2$ may vary between the same ranges discussed above. A torque jog may comprise any number of torque increases and decreases. In some embodiments, as illustrated in FIG. 5A, a torque jog may include only a single torque increase and a single torque decrease, while in other embodiments, a torque jog may include several torque increases and/or decreases (see FIGS. 5B and 5C).

Figure 5C:
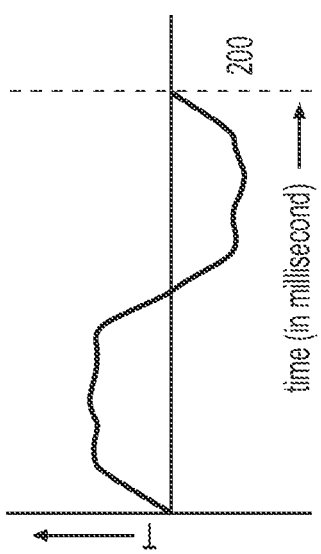
Figure 5D:
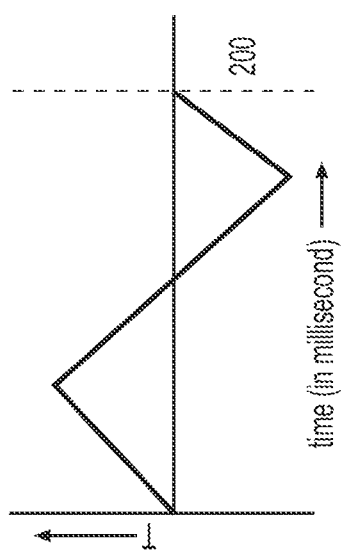

Although FIG. 5A illustrates a torque jog in which the output torque is maintained substantially constant (for a fixed time) at the upper and lower ends (that is, at $T_1+\Delta T$ and $T_1-\Delta T$), this is not a requirement. As illustrated in FIGS. 5B and 5C, the torque fluctuations may have any pattern. Although FIGS. 5A-5C illustrate torque jogs in which the motor output torque is first increased and then decreased, this is not a requirement. In some embodiments, the motor output torque may first be decreased and then increased (that is, $T_1-\Delta T_2$ followed by $T_1+\Delta T_1$). Further, as illustrated in FIG. 5D, in some embodiments of torque jog, the motor output torque may only be increased (or decreased). This increase or decrease in torque may be repeated any number of times and may have any pattern (as described with reference to FIGS. 5A-5C).

While principles of the present disclosure are described herein with reference to powertrains for electric buses, it should be understood that the disclosure is not limited thereto. Rather, the systems and methods described herein may be employed in any type of electric vehicle. Also, those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of executing a gear shift in a gearbox of an electric vehicle from a current gear to a subsequent gear, wherein the gearbox couples an electric motor to a drive wheel, comprising:
   executing a gear disengagement within the gearbox, wherein the gear disengagement includes shifting from the current gear to neutral;
   activating a torque jog in the electric motor to assist with the gear disengagement, wherein the torque jog results in a fluctuation in torque output by the electric motor; and
   after activating the torque jog, shifting from neutral to the subsequent gear.

2. The method of claim 1, wherein activating the torque jog includes activating the torque jog substantially simultaneously with executing the gear disengagement.

3. The method of claim 1, wherein activating the torque jog includes activating the torque jog a predetermined time after executing the gear disengagement.

4. The method of claim 1, wherein the electric motor is operatively decoupled from the drive wheel when the gear box is in neutral, and
   wherein activating the torque jog includes activating the torque jog to assist with the gear disengagement only if the current gear does not shift to neutral within a predetermined time after executing the gear disengagement.

5. The method of claim 1, wherein activating a torque jog includes varying the torque output of the electric motor above and below a fixed value within a predetermined time.

6. The method of claim 1, wherein the electric vehicle includes a fluid-activated actuator configured for executing the gear shift within the gearbox, and the method further includes selectively directing pressurized fluid into the actuator to assist with the gear disengagement.

7. The method of claim 6, wherein wherein the electric motor is operatively decoupled from the drive wheel when the gearbox is in neutral, and
selectively directing pressurized fluid includes directing the burst of pressurized fluid into the actuator when shifting from the current gear to neutral.

8. The method of claim 7, wherein selectively directing the pressurized fluid includes directing the pressurized fluid into the actuator only if the the current gear does not shift to neutral within a predetermined time after executing the gear disengagement.

9. The method of claim 1, wherein the electric vehicle is an electric bus and the electric motor, the gearbox, and the drive wheel extend along a linear axis.

10. A method of executing a gear shift in a gearbox of an electric vehicle from a current gear to a subsequent gear, wherein the gearbox couples an electric motor to a drive wheel, and a fluid-activated actuator configured to perform a gear shift in the gearbox, comprising:
executing a gear disengagement within the gearbox, wherein the gear disengagement includes shifting from the current gear to neutral;
selectively activating one or both of (a) a torque jog in the electric motor to assist with the gear disengagement, and (b) a pressurized fluid into the actuator to assist with the gear disengagement, wherein the torque jog results in a fluctuation in torque output by the electric motor; and
after activating one or both of the torque jog and the pressurized fluid into the actuator, shifting from neutral to the subsequent gear.

11. The method of claim 10, wherein the selectively activating includes activating one or both of the torque jog and the pressurized fluid substantially simultaneously with executing the gear disengagement.

12. The method of claim 10, wherein the selectively activating includes activating one or both of the torque jog and the pressurized fluid a predetermined time after executing the gear disengagement.

13. The method of claim 10, the electric motor is operatively decoupled from the drive wheel when the gear box is in neutral, and
wherein the selectively activating includes activating one or both of the torque jog and the pressurized fluid only if the current gear does not shift to neutral within a predetermined time after executing the gear disengagement.

14. The method of claim 10, wherein activating a torque jog includes varying the torque output of the electric motor above and below a fixed value within a predetermined time.

15. An electric vehicle, comprising:
an electric motor;
a drive wheel;
a gearbox configured to shift from a first configuration of gears to a second configuration of gears through a neutral configuration, wherein (a) in the first and second configurations, the electric motor is operatively coupled to the drive wheel with different gear ratios, and (b) in the neutral configuration, the electric motor is operatively decoupled from the drive wheel;
a fluid activated actuator configured to shift the gearbox from the first configuration to the second configuration; and
a controller configured to:
execute a gear disengagement within the gearbox, wherein the gear disengagement includes shifting from the first configuration to the neutral configuration;
activate a torque jog in the electric motor to assist with the gear disengagement, wherein the torque jog results in a fluctuation in torque output by the electric motor; and
after activating the torque jog, shifting from the neutral configuration to the second configuration.

16. The electric vehicle of claim 15, wherein the controller is further configured to direct a pressurized fluid into the actuator, substantially simultaneously with executing the gear disengagement.

17. The electric vehicle of claim 16, wherein directing the pressurized fluid into the actuator includes directing the pressurized fluid when shifting from the first configuration to the neutral configuration.

18. The electric vehicle of claim 15, wherein activating the torque jog includes varying the torque output above and below a fixed value.

19. The electric vehicle of claim 15, wherein the controller is configured to activate the torque jog a predetermined time after executing the gear disengagement.

20. The electric vehicle of claim 15, wherein the electric motor, the gearbox and the drive wheel extend along a linear axis.

* * * * *